Dec. 2, 1958 — J. C. McALVAY — 2,862,518
DIRECTIONAL FLOW CONTROL VALVE
Filed May 23, 1956 — 2 Sheets-Sheet 1
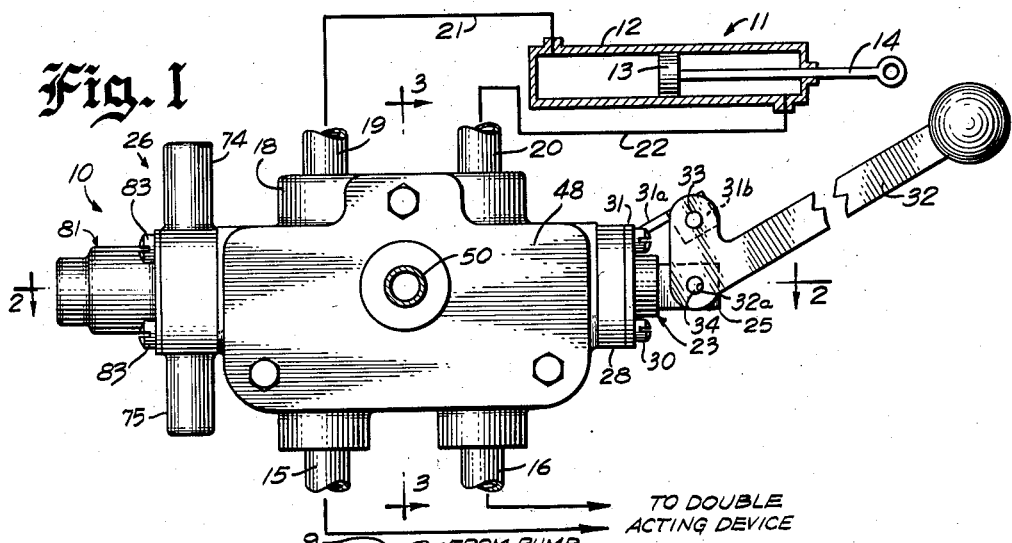
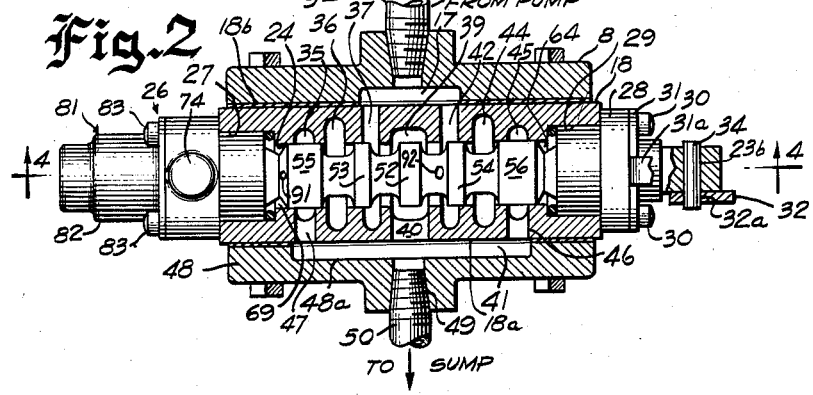
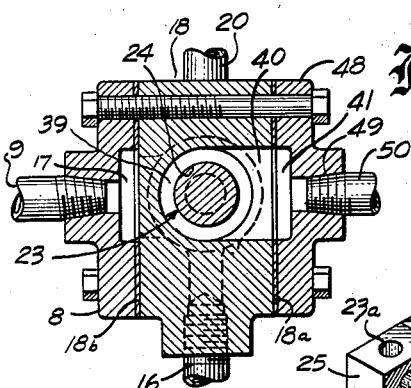
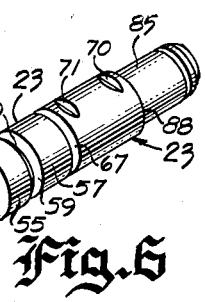
Inventor
John C. McAlvay
by Mason, Kolehmainen, Rathburn and Wyss.
Attorneys

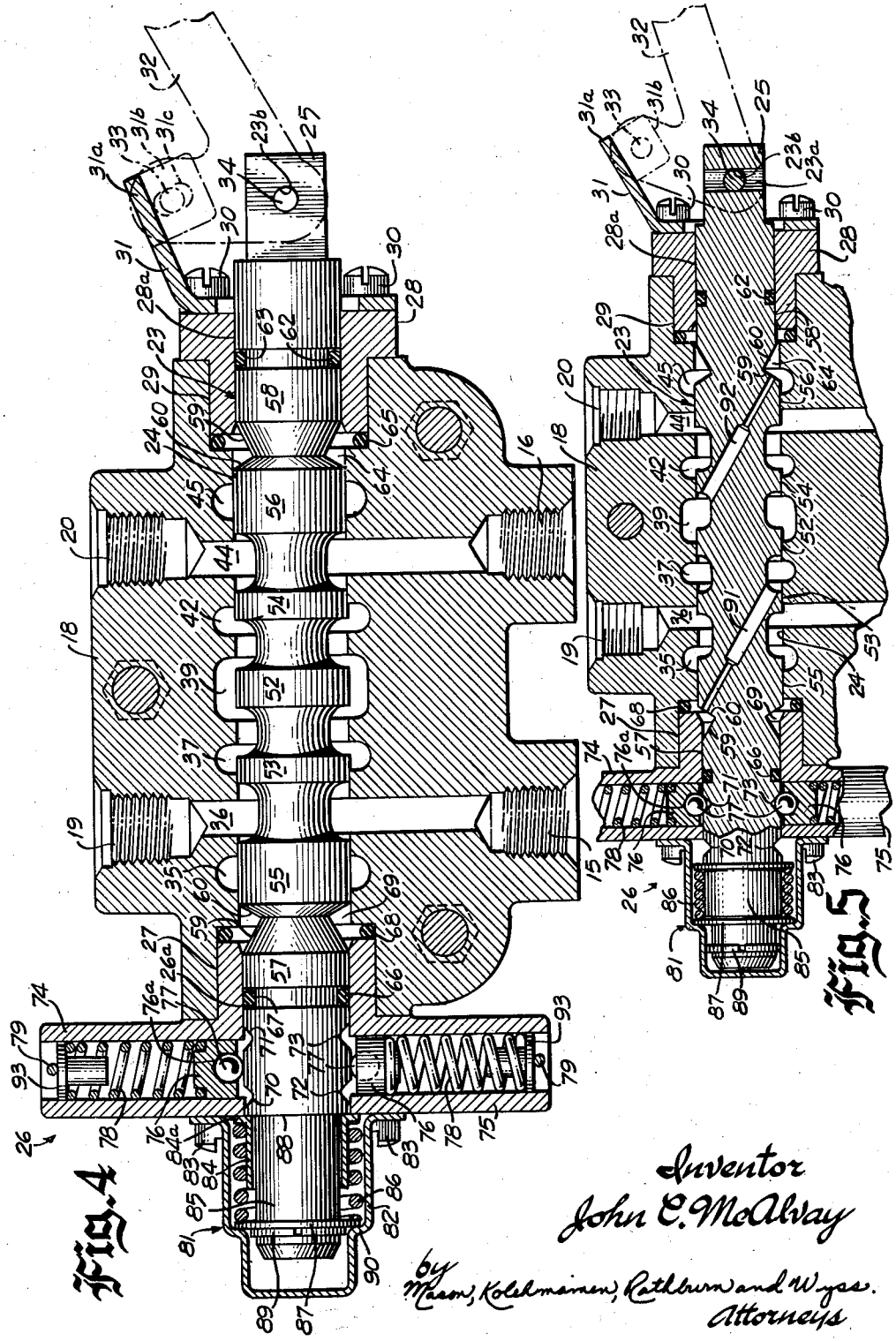

United States Patent Office 2,862,518
Patented Dec. 2, 1958

2,862,518

DIRECTIONAL FLOW CONTROL VALVE

John C. McAlvay, Racine, Wis., assignor to Webster Electric Company, Racine, Wis., a corporation of Delaware Application March 23, 1956, Serial No. 573,483

2 Claims. (Cl. 137—622.5)

This invention relates generally to valves for controlling the supply of fluid to fluid-operated devices and, more particularly, to a new and improved valve for controlling the delivery of fluid in remote control systems.

The control valve of the present invention is particularly well suited for use in remote control systems of the type employed in the raising and lowering of work implements carried by a tractor or the like, although it should be understood that the invention is not limited to use in this particular environment. Frequently, in tractor control systems, it is desirable to provide for the raising and lowering of work implements of entirely different types demanding different flow conditions. Thus, for example, when a tractor is provided with a front cultivator implement or the like, an on-off fluid flow is desirable wherein the fluid is so controlled that either full flow or no flow conditions may be selectively effected. For this type of operation, a flow control valve which is locked in an "on" or full flow position as by means of detents is generally employed. Valves of the latter type are well known and have been used before in the raising and lowering of fluid-operated devices. However, when the tractor carries a work implement such as a front loader performing earth moving functions and the like it is desirable to provide for a relatively fine adjustment of the depth of penetration of the tool into the earth. To this end, a "nudging" type control is desirable wherein fluid flows for brief periods in response to movement of a manually operated control or the like. In systems of the latter type, it would, of course, be undesirable to lock the valve in its "on" positions since such a locking action would provide for full flow of fluid to the device and would effectively destroy the "nudging" action desired. Accordingly, one of the principal objects of the present invention is to provide a flow control valve which may be selectively connected so as to be locked in its "on" positions or, alternatively, may be so connected that the locking means is rendered ineffective and the valve is subject primarily to manual control.

In flow control valves of the type described above, it is frequently desirable to provide an automatic cutoff operated by increasing pressure in the supply line to reset the valve in order to bypass the fluid and prevent its delivery to the fluid-operated device. Valves performing this function have been used before but the valve reset mechanism of these prior art devices has generally been characterized by complex construction with the increased cost of installation and maintenance incident thereto. It is, therefore, another object of the present invention to provide an automatic cutoff mechanism characterized by simplicity of construction and efficiency of operation.

A further object of the invention is to provide a new and improved hydraulically balanced flow control valve of relatively simple construction, thus lending itself to convenient installation, repair and replacement.

The invention, both as to its organization and method of operation, together with further objects and advantages thereof will best be understood by reference to the following detailed description taken in conjunction with the accompanying drawings, wherein:

Fig. 1 is a partially schematic view showing the flow control device of the present invention as used in a system for controlling the flow of fluid to a double acting hoist or the like;

Fig. 2 is a sectional view showing the flow control device only and taken along a line substantially corresponding to the line 2—2 in Fig. 1;

Fig. 3 is a sectional view taken along a line substantially corresponding to the line 3—3 in Fig. 1;

Fig. 4 is an enlarged sectional view taken along a line substantially corresponding to the line 4—4 in Fig. 2 and showing the flow control device with its plunger in neutral or off position;

Fig. 5 is a fragmentary, reduced sectional view of the valve shown in Fig. 4 shown with the valve plunger locked in one of its "on" positions; and Fig. 6 is a perspective view of the plunger used in the valve of the present invention.

Referring now to the drawings and particularly to Fig. 1 thereof, the invention is there illustrated as embodied in a valve 10 for controlling the flow of fluid such as oil from a suitable supply pump or the like to a double acting work device or hoist 11. The work device 11 may be of the type having a work cylinder 12 and a fluid operated piston 13 slidable therein in order to operate a work arm or piston rod 14 connected to a suitable work implement of the type described above. The fluid from the pump is delivered to a fluid inlet 9 emptying into a common fluid inlet chamber 17 formed between a flat side 18b of the main body 18 of the valve 10 and a recess in a detachable side plate 8 (Fig. 2) bolted or otherwise secured to the main body. Spaced outlets or work ports 19 and 20 in this valve body deliver fluid through suitable supply conduits 21 and 22, respectively, to one side or the other of the piston 13 or function to deliver exhaust fluid from the piston to the flow control valve 10 in the manner described below. A second pair of outlets 15 and 16 is formed in the valve body at positions diametrically opposed from the work ports 19 and 20, respectively, in order to provide for alternating fluid delivery to and return from a second double acting device. Actually, with the ports 19 and 20 in use, the outlets 15 and 16 are sealed by suitable plugs, and, with ports 15 and 16 in use, ports 19 and 20 are sealed, so that only one pair of ports will be used in a particular installation. However, the described arrangement is quite convenient in permitting selective connection of the double acting device to either side of the valve 10.

For the purpose of accommodating a valve plunger 23 controlling the flow of fluid through the valve 10, the main body 18 is provided with a longitudinal bore 24, disposed in approximately its center. To accommodate end plates 26 and 28 respectively secured to opposed ends of the main body 18 each end of the longitudinal bore 24 is preferably enlarged. Specifically, the enlarged end portion 27 of the bore 24 receives an end plate 26 which functions as a housing for the detent mechanism and the plunger centering device to be described more fully below.

Similarly, end plate 28 is received within an enlarged portion 29 at the opposite end of the bore 24 and is secured to the main body portion 18. A valve actuator support 31 is secured on the outer side of the end plate 28 in any convenient manner as by means of bolts 30 passing through the plate 31 and into engagement with threaded openings in the end plate 28. The actuator support 31 includes an outwardly extending support arm 31a having an enlarged portion 31b on its outermost end for pivotally supporting a manually operated valve actuating handle 32, as best shown in Figs. 1 and 4 of the drawings.

Specifically, the enlarged portion 31b is provided with an elongated slot 31c for receiving a pin 33 carried by the handle 32, thereby providing for limited movement of the pin within the slot. This limited movement facilitates conversion of the rotary movement of the valve actuating handle 32 into sliding movement of the plunger 23. The latter plunger is secured to the valve actuating handle by means of a connecting pin passing through an opening 32a in the handle and through either one or the other of the openings 23a or 23b in the end portion 25 of the valve plunger. As best shown in Fig. 6 of the drawings, the extreme outer end portion 25 is preferably square in cross section while the remaining portion of the plunger is generally cylindrical. The openings 23a and 23b pass through the outer end portion 25 of the plunger at right angles to each other and normal to the longitudinal axis of the plunger and, accordingly, these openings are displaced 90° one from the other. The purpose of providing these two different openings to connect the plunger and its actuator in angularly displaced positions is described more fully below.

A plurality of longitudinally spaced fluid chambers formed in the valve body 18 adjacent the bore 24 facilitates control of fluid flow by the valve plunger 23. These chambers, as best shown in Figs. 2, 4 and 5, comprise, from left to right, an exhaust chamber 35 connected through a passageway 47 (Fig. 2) to a common exhaust chamber 41, a work chamber 36 connected directly to the work ports 15 and 19 (Figs. 4 and 5), an inlet chamber 37 connected through a transversely extending passageway 17 (Fig. 2) to the common fluid inlet means 17, a bypass chamber 39 connected through passageway 40 (Fig. 2) to the exhaust chamber 41, a fluid inlet chamber 42 connected through a passageway (Fig. 2) to the common fluid inlet means 17, a work chamber 44 connected directly to the work ports 16 and 20 (Figs. 4 and 5) and an exhaust chamber 45 connected through passageway 46 (Fig. 2) to the common exhaust chamber 41. The common exhaust chamber 41, as is best shown in Fig. 2, is preferably formed between a flat side 18a of the main body portion 18 and a recess 48a in a side plate 48 bolted or otherwise secured to the main body 18. The latter side plate includes a threaded outlet 49 for accommodating a fluid line 50 delivering exhaust fluid from the valve to a tank or sump not shown in the drawings.

With the valve plunger 23 in the neutral or "off" position shown in Figs. 2 and 4, fluid flows from the inlet 9 to the common inlet chamber 17, through chambers 37 and 42 and along the valve plunger 23 to exhaust chamber 39 from which it is returned to the sump through passageway 40, common exhaust chamber 41 and outlet 49. Thus, fluid delivered to the valve 10 is bypassed directly to the sump to prevent build up of pressure when the valve is in neutral. The valve plunger 23 includes a center land 52, a pair of relatively small lands 53 and 54, and a pair of relatively large lands 55 and 56, all having the same diameter which will hereinafter be referred to as the diameter of the valve plunger. In the neutral position of the valve, the lands 53 and 54 prevent the delivery of fluid from the inlet to the work ports 19 and 20 while the lands 55 and 56 cover the exhaust ports 35 and 45, respectively, in order to prevent the exhaust of fluid from either end of the cylinder 12. Thus, with the valve plunger in neutral position, fluid is trapped on both sides of the piston 13 and the fluid operated device 11 is held in position.

In order to deliver fluid to the work port 20 and, at the same time, to connect work port 19 to exhaust, the plunger 23 may be moved from its neutral position to the left by rotating the actuating handle 32 in a clockwise direction as viewed in Fig. 4. The plunger 23 then occupies a position at the extreme left of the bore 24, as shown in Fig. 5, and fluid from inlet chamber 42 flows through the space between lands 54 and 56 to work chamber 44 and then to work port 20. At the same time, work port 19 is connected to exhaust chamber 35 and hence to the sump through work chamber 36 and through the annular space between lands 53 and 55 of the valve plunger. Thus, with the valve plunger moved to the left, fluid is delivered through conduit 22 to the right side of piston 13 while the left side of the piston is exhausted through conduit 21. The piston 13, therefore, moves to the left and the piston rod 14 functions to move the work implement in a desired direction. Similarly, when valve plunger 23 is moved to the right within the bore 24, the work port 20 is connected to exhaust chamber 45 and work port 19 receives fluid from inlet chamber 37. Under the latter conditions, of course, piston 13 is moved to the right to return the work implement. The valve plunger 23 may be locked in either of its "on" positions by suitable detent mechanisms carried within the housing 26 and described more fully below.

For the purpose of providing automatic return of the valve plunger 23 from either of its "on" positions to neutral, there are provided the pistons 57 and 58 (Figs. 4 and 5) disposed adjacent the lands 55 and 56, respectively. Each of these pistons has a diameter somewhat less than the diameter of the lands of the valve plunger and each is spaced somewhat from the associated end of the plunger by oppositely tapered portions 59 and 60 which cooperate with the body 18 of the valve to form small fluid pockets. Specifically, the piston 58 is accommodated within a longitudinally extending central opening 28a in the end plate 28. The diameter of the opening 28a is substantially equal to that of the piston 58 with the result that a fairly tight fit is provided between these two elements. However, in order to prevent the escape of fluid along the periphery of the piston 58, there is provided a sealing ring 62 seated within an annular groove 63 in the piston. The tapered portions 59 and 60 cooperate with the walls of the bore 24 and with the walls defining the opening 28a in order to provide a fluid pocket 64 between the piston 58 and the large land 56 on the valve plunger. To prevent the escape of fluid from this fluid pocket around the end plate 28, there is provided a sealing ring 65.

Similarly, the piston 57 at the other end of the valve plunger is seated within a central opening 26a in the housing 26 which opening again has a diameter substantially equal to that of the piston 57. A sealing ring or gasket 66 seated within an angular groove 67 prevents the escape of fluid along the outer surface of the piston 57 while a similar sealing ring 68 is interposed between the adjacent surfaces of the housing 26 and the main body 18 to prevent fluid escape between these elements. The tapered portions 59 and 60 of the valve plunger cooperate with the bore 24 and the walls defining the opening 26a to form a fluid pocket 69 disposed between the large land 55 and the piston 57. Fluid flow to and from the pockets 64 and 69 is effected by means of inclined passageways 91 and 92 formed in the valve plunger 23 and extending generally parallel to each other as is best shown in Fig. 5. Passageway 91 extends from the groove between lands 52 and 53 to pocket 69 and passageway 92 from the groove between lands 52 and 54 to pocket 64.

For the purpose of receiving the detents referred to above in order to lock the plunger 23 in either of its "on" positions, the end of the plunger extending beyond the piston 57 is preferably provided with relatively short and spaced detent receiving grooves 70 and 71 located on one face of the plunger and similar grooves 72 and 73 displaced 180° from the grooves 70 and 71, respectively. In order to support the detent mechanism cooperating with these detent receiving grooves, the housing 26 includes a pair of tubular extensions 74 and 75 protruding in opposite directions from the central opening 26a. Each of these tubular extensions encloses a piston 76 having a ball retaining pocket 76a therein for accommodating a detent ball 77. The piston 76 is urged inwardly toward the longitudinal axis of the plunger 23 by means of a coil spring 78 interposed between the upper face of the piston and a plug or cap 93 which is retained in fixed position within its tubular extension by means of a transversely extending pin 79. In view of the foregoing description, it will be recognized that the detent balls 77 are normally urged by the springs 78 against the outer surface of the plunger 23. Thus, when the plunger 23 is moved toward the left from the neutral position shown in Fig. 4, these detent balls are seated within the pair of grooves 71 and 73 while when the piston is moved to the right, the detent balls seat within the grooves 70 and 72, thereby to lock the plunger in either of its "on" positions.

A spring centering arrangement indicated generally at 81 normally urges the plunger 23 from either of the "on" positions toward its neutral or "off" position. This centering arrangement is enclosed within a cup-shaped member 82 secured to the housing 26 by means of bolts 83. The single spring centering arrangement employed includes a sleeve 84 encircling a cylindrical extension 85 of the valve plunger and including an outwardly extending flanged portion 84a. A coil spring 86 encircling this sleeve is retained between the flanged portion 84a and an annular ring 87 slidably mounted on the cylindrical extension 85. Movement of the sleeve 84 toward the right as viewed in Fig. 4 is limited by engagement of the flanged portion 84a with a shoulder 88 formed on the valve plunger between the cylindrical extension 85 and the piston 57. Movement of the annular ring 87 to the left as viewed in Fig. 4 is limited by a collar 89 affixed to the cylindrical extension 85. With the valve plunger 23 in neutral position as shown in Fig. 4, the spring 86 seats the flange 84a against the shoulder 88 and at the same time urges the annular ring 87 into engagement with the collar 89. When the valve plunger is moved to the left toward the position shown in Fig. 5, the ring 87 is engaged by a shoulder portion 90 of the cup-shaped housing 82 and hence, is prevented from moving to the left with the valve plunger. The collar 89, of course, moves away from the ring 87 while the shoulder portion 88 forces the sleeve 84 to the left to compress coil spring 86. The compressed coil spring 86 of the spring centering mechanism 81 urges the valve plunger 23 toward the right but, the force of this spring is insufficient to overcome the action of the detent balls 77 which, at this time, are seated within the grooves 71 and 73.

With the valve in the left hand position, fluid from the inlet chamber 37 is delivered through the inclined passageway 91 in the valve plunger 23 to the fluid pocket 69. At the same time, the fluid pocket 64 at the other end of the valve plunger is connected to exhaust chamber 39 through the inclined passageway 92. The fluid pressure in the pocket 69 acts upon the piston 57 and upon the land 55 and, due to the difference in diameter between these two elements, there is a net fluid force urging the plunger 23 to the right or towards neutral position. Thus, this fluid force acts in the same direction as the single spring centering arrangement 81. However, under normal pressure conditions the combined effect of the fluid within the pocket 69 and the spring force of the mechanism 81 is insufficient to overcome the action of the detent mechanism and, accordingly, the valve plunger is retained in its "on" position. As soon as piston 13 reached the stop at the end of its work stroke, the pressure rises to the preset value at which the detent mechanism is overcome, thus enabling the combined effect of the centering arrangement and the fluid in pocket 69 to center the valve plunger. A second possible function of the return mechanism would be as an overload protection, in which the presetting of the detent mechanism determines a maximum pressure at which the system will function, and in excess of which the valve plunger will be automatically centered. In any event, when the fluid pressure exceeds a predetermined level, the combined effect of the spring centering arrangement 81 and the fluid within the pocket 69 is sufficient to unseat the detent balls 77 from the grooves 71 and 73, at which time the valve will automatically be returned to neutral position shown in Fig. 4. With the valve in neutral, the spring centering arrangement 81 ceases to exert its restoring force and at the same time the fluid pressure in the pocket 69 is exhausted through the passageway 91 to exhaust chamber 39. In neutral position, of course, both of the fluid pockets 69 and 64 are connected through passageways 91 and 92, respectively, to exhaust chamber 39 and, accordingly, no force is exerted in either direction on the plunger 23.

As indicated above, when the plunger 23 is moved to the right by counterclockwise rotation of the valve actuating handle 32 as viewed in Figs. 1 and 4, the detent balls 77 are seated within grooves 70 and 72. The flange 84a is prevented from moving to the right by engagement with the innermost ends of the tubular supports 74 and 75, with the result that the sleeve 84 is retained in position. The collar 89 engages the annular ring 87 to move the latter to the right in order to compress the coiled spring 86. As a result, this spring urges the plunger toward the left as viewed in Fig. 4, but again the force of the spring 86 is insufficient to overcome the action of the detent mechanism holding the plunger 23 in "on" position. With the plunger 23 in the right hand position, fluid flows from the inlet chamber 42 through the inclined passageway 92 in the valve plunger to the fluid pocket 64. The fluid pocket 69 is connected to exhaust chamber 39 by means of inclined passageway 91. Due to the difference in the diameters of the land 56 and the piston 58 exposed to the fluid in the pocket 64, there is a net fluid force on the piston urging the valve plunger to the left. Thus, the force of the single spring centering arrangement 81 and the force of the fluid within the pocket 64, act in the same direction and tend to return the valve plunger to neutral or "off" position. However, until the pressure within the chamber 64 exceeds a certain predetermined value, this combined force is insufficient to overcome the action of the detent mechanism holding the valve in the "on" position. The detent mechanism and the single spring centering arrangement 81 may be so selected and adjusted that the valve is returned to neutral when the piston 13 reaches the end of its work stroke at which time the pressure will build up and become excessive, or in the alternative, the valve may be adjusted to return to neutral whenever the pressure exceeds any other selected abnormal value.

As previously indicated, operation of the detent mechanism to hold the valve plunger 23 is particularly desirable when the valve is used to control a work implement such as a tractor front cultivator or the like. For controlling the raising and lowering of such an implement, it is generally desirable either to have the front cultivator in fully raised position or in its lower position and, to this end, on-off type control of fluid flow to the fluid operated device is preferable. This on-off fluid flow is, of course, effected by locking the valve plunger in either of its "on" positions as described above. However, in certain installations it is desirable to provide for a "nudging" type adjustment of the position of the work implement in which the implement is raised or lowered in degrees by manual operation of the valve handle 32. This particular type of operation is particularly desirable in the case of a tractor front loader and, to effect the required control, it is undesirable to have the valve plunger locked in either of its "on" positions. Consequently, in accordance with an important feature of the present invention, the valve device 10 may be selectively operated either with or without the effects of the detent mechanism by a relatively simple change which can be readily performed either in the field or during installation of the valve. To this end, the detent mechanism may be disabled by rotating the valve plunger 90° about its longitudinal axis, so that the detent balls 77 ride upon the periphery of the plunger and are moved out of the path of the grooves 70, 71, 72 and 73. To effect this rotation, the connection between bracket 31 and the valve handle 32 may be broken and force can be applied to the handle to turn the plunger. When the plunger has been turned 90°, the pin 34 may be removed from the opening 23b and from the opening 32a in the valve handle to permit reconnection of the handle to the support 31. Pin 34 may next be reinserted through opening 32a and opening 23a after the latter two openings have been aligned by proper disposition of the handle. With the detents moved out of the path of grooves 70, 71, 72 and 73 when the valve plunger is moved to the right or to the left within the bore 24, the detent balls will not be seated within the grooves, but will instead remain in engagement with the periphery of the plunger. By the described arrangement, the present invention may be employed either with the detent mechanism effective to lock the valve plunger in either of its "on" positions or with the detent mechanism rendered ineffective merely by rotation of the plunger coupled with a relatively simple change of the connection between the valve actuating handle and the free end of the plunger. It will be observed that the two positions in which the connections between the handle and the plunger may be made are 90° displaced one from the other about the longitudinal axis of the plunger.

In view of the foregoing description, the operation of the control valve of the present invention will be readily apparent to those skilled in the art without further detailed discussion.

While a particular embodiment of the invention has been shown and described, it will be apparent that many modifications may be made by those skilled in the art, and it is, therefore, contemplated by the appended claims to cover any such modifications as fall within the true spirit and scope of the invention.

What is claimed as new and desired to be secured by Letters Patent of the United States is:

1. A valve for controlling the delivery of fluid to a double acting fluid operated device, said valve comprising a valve body having a valve bore therein; a generally cylindrical valve plunger including a center land, first and second lands disposed on opposite sides of and equidistant from said center land and third and fourth lands spaced from said first and second lands, respectively; first and second pistons on said plunger spaced from said third and fourth lands, respectively, and having diameters equal to each other but less than the diameter of the plunger; means forming a first fluid pocket between said third land and said first piston; means forming a second fluid pocket between said fourth land and said second piston; a first inclined passageway in said plunger extending from said first fluid pocket to the space between said first land and the center land; a second inclined passageway in the plunger extending between the second fluid pocket and the space between the second land and the center land; a fluid outlet port in said bore intermediate its ends; first and second fluid inlet passages intersecting said bore on opposite sides of said port; first and second work ports communicating with said bore at positions spaced respectively from said first and second inlet passages; first and second fluid return passages connected to said outlet port and communicating with said bore at positions spaced respectively from said first and second work ports; said valve plunger having an "off" position in which said first and second inlet passages are connected to said outlet port and the work ports are blocked both from the inlet passages and the fluid return passages; said valve plunger being movable to a first position wherein the first fluid inlet passage is connected to the first work port through the space between the first and third lands, while the second work port is connected to the second fluid return passage through the space between the second and fourth lands, said first land and said second land being effective to isolate said outlet port from said first and second inlet passages and to connect said first passageway to said outlet port when the plunger is in said first position and also to connect said second fluid pocket through said second passageway to said second inlet passage so that a fluid force is developed on said plunger tending to return the valve plunger to said "off" position, said valve plunger being movable to a second position wherein the second fluid inlet passage is connected to the second work port through the space between the second and fourth lands while the first work port is connected to the first fluid return passage through the space between the first and third lands, said outlet port again being isolated from both of said inlet passages and the first passageway being connected to the first inlet passage in order to supply fluid to said first pocket to develop a force on said plunger tending to return the plunger to said "off" position.

2. A valve for controlling the delivery of fluid to a fluid operated device, said valve comprising a valve body having a valve bore therein, a generally cylindrical valve plunger including a center land, first and second lands disposed on opposite sides of and equidistant from said center land and third and fourth lands spaced from said first and second lands, respectively, first and second pistons on said plunger spaced from said third and fourth lands, respectively, and having diameters equal to each other but less than the diameter of the plunger, means forming a first fluid pocket between said third land and said first piston, means forming a second fluid pocket between said fourth land and said second piston, a first passageway in said plunger extending from said first fluid pocket to the space between said first land and the center land, a second passageway in the plunger extending between the second fluid pocket and the space between the second land and the center land, first and second fluid inlet passages intersecting said bore, first and second work ports communicating with said bore at positions spaced respectively from said first and second inlet passages, first and second fluid outlet passages communicating with said bore at positions respectively spaced from said first and second work ports, said valve plunger having an "off" position in which the work ports are blocked both from the inlet passages and the fluid outlet passages, said valve plunger being movable to a first position wherein the first fluid inlet passage is connected to the first work port, the second work port is connected to the second fluid outlet passage, said first passageway is connected to one of said outlet passages and the second passageway is connected to said second inlet passage so that a fluid force is developed on said plunger tending to return the valve plunger to said "off" position, said valve plunger being movable to a second position wherein the second fluid inlet passage is connected to the second work port, the first work port is connected to the first fluid outlet passage, the second passageway is connected to one of the outlet passages, and the first passageway is connected to the first inlet passage in order to supply fluid to said first pocket to develop a force on said plunger tending to return the plunger to said "off" position.

References Cited in the file of this patent

UNITED STATES PATENTS

| | | |
|---|---|---|
| 2,184,793 | Clench | Dec. 26, 1939 |
| 2,572,705 | Edman | Oct. 23, 1951 |